US007060136B1

(12) United States Patent
Zeiher et al.

(10) Patent No.: US 7,060,136 B1

(45) **Date of Patent: *Jun. 13, 2006**

(54) METHOD OF MONITORING MEMBRANE CLEANING PROCESSES

(75) Inventors: E H Kelle Zeiher, Naperville, IL (US); Bosco P Ho, Wheaton, IL (US); John E. Hoots, St. Charles, IL (US)

(73) Assignee: Nalco Company, Naperville, IL (US)

( * ) Notice: Subject to any disclaimer, the term of this patent is extended or adjusted under 35 U.S.C. 154(b) by 204 days.

This patent is subject to a terminal disclaimer.

(21) Appl. No.: 10/108,694

(22) Filed: Mar. 28, 2002

(51) Int. Cl.
*B08B 7/04* (2006.01)

(52) U.S. Cl. .......................................... 134/18; 134/42

(58) Field of Classification Search .................. 134/18, 134/22.1, 22.19, 42, 22, 19; 422/82.07, 82.08; 210/639, 636

See application file for complete search history.

(56) References Cited

U.S. PATENT DOCUMENTS 4,496,470 A * 1/1985 Kapiloff et al. ............. 510/162
4,783,314 A 11/1988 Hoots et al.
4,992,380 A 2/1991 Moriarty et al.
5,320,967 A 6/1994 Avallone et al.
5,416,323 A 5/1995 Hoots et al.
5,714,387 A 2/1998 Fowee et al.
6,329,165 B1 12/2001 Chattoraj et al.
6,685,840 B1 * 2/2004 Hatch ......................... 210/739
6,699,684 B1 * 3/2004 Ho et al. ...................... 435/29
6,821,428 B1 * 11/2004 Zeiher et al. ............... 210/634
6,838,001 B1 * 1/2005 Zeiher et al. ............... 210/639

* cited by examiner

*Primary Examiner*—Michael Barr
*Assistant Examiner*—Saeed Chaudhry
(74) *Attorney, Agent, or Firm*—Michael B. Martin; Thomas M. Breininger

(57) ABSTRACT

Methods and systems for monitoring and/or controlling the cleaning of membrane separation systems or processes are provided. The present invention utilizes measurable amounts of inert fluorescent tracer(s) added to a membrane cleaning process stream to evaluate and/or control the removal of contaminants and/or impurities during cleaning. The methods and systems of the present invention can be utilized in a variety of different industrial applications including raw water processing and waste water processing.

20 Claims, No Drawings

METHOD OF MONITORING MEMBRANE CLEANING PROCESSES

FIELD OF THE INVENTION

This invention relates generally to membrane cleaning and, more particularly, to methods for monitoring and/or controlling the cleaning of membrane separation systems.

BACKGROUND OF THE INVENTION

Membrane separation, which uses a selective membrane, is a fairly recent addition to the industrial separation technology for processing of liquid streams, such as water purification. In membrane separation, constituents of the influent typically pass through the membrane as a result of a driving force(s) in one effluent stream, thus leaving behind some portion of the original constituents in a second stream. Membrane separations commonly used for water purification or other liquid processing include microfiltration (MF), ultrafiltration (UF), nanofiltration (NF), reverse osmosis (RO), electrodialysis, electrodeionization, pervaporation, membrane extraction, membrane distillation, membrane stripping, membrane aeration, and other processes. The driving force of the separation depends on the type of the membrane separation. Pressure-driven membrane filtration, also known as membrane filtration, includes microfiltration, ultrafiltration, nanofiltration and reverse osmosis, and uses pressure as a driving force, whereas the electrical driving force is used in electrodialysis and electrodeionization. Historically, membrane separation processes or systems were not considered cost effective for water treatment due to the adverse impacts that membrane scaling, membrane fouling, membrane degradation and the like had on the efficiency of removing solutes from aqueous water streams. However, advancements in technology have now made membrane separation a more commercially viable technology for treating aqueous feed streams suitable for use in industrial processes.

During membrane separation, deposits of scale and foulants on the membrane can adversely impact the performance of the membrane. For example, in membrane filtration such foulants and scales can decrease the permeate flow for a given driving force, lowering the permeate quality (purity), increasing energy consumed to maintain a given permeate flow or the like. This can necessitate the cleaning of the membrane separation system in order to remove the scalants, foulants and the like from the membrane separation system. Thus, the performance of the membrane system in use can be enhanced.

In general, the membrane cleaning process includes adding a suitable cleaning agent and circulating it within the membrane separation system. In this regard, the cleaning agent acts to remove sealants, foulants or the like that have deposited on surfaces of the membrane system, including the membrane itself. After the membrane system has been washed with the cleaning agent, the system is then, in general, flushed or rinsed to remove the cleaning agent along with other impurities that may remain in the system.

Membrane cleaning processes usually consist of removing the membrane system from service, rinsing the membrane system (membranes, housings and associated piping) with high quality (preferably permeate quality) water, preparing a cleaning solution by adding the cleaner to a specified volume of permeate quality water, heating the cleaning solution, circulating the cleaning solution at low pressure through the membranes and back into the clean-in-place (CIP) tank thereby displacing the rinse water and diluting the cleaning solutions. The cleaning process further consists of alternately circulating the cleaning solution through the membrane system and soaking the membrane system in the cleaning solution. During the process the system may be rinsed and fresh cleaning solution applied as needed. Finally the system is rinsed with permeate quality water and either subjected to a second cleaning or placed back in service.

Typically, the membrane cleaning process is maintained by evaluating a variety of different process conditions, particularly the pH of the system during cleaning. However, this type of monitoring is not very specific and/or selective to, for example, the concentration of the cleaning agent during cleaning. In this regard, fluctuations in the amount of cleaning agent may not be effectively identified. Thus, the amount of cleaning agent may not be effectively monitored and thereby controlled in order to enhance the performance of the cleaning process.

Accordingly, a need exists to monitor and/or control the cleaning of membrane separation systems where conventional monitoring techniques lack the sensitivity, selectivity and/or accuracy necessary to adequately monitor one or more process parameters specific to the cleaning of membranes or systems in order to adequately evaluate the performance of the same.

SUMMARY OF THE INVENTION

The present invention provides methods and systems for monitoring and/or controlling the cleaning of membrane separation systems. In this regard, the detection of inert fluorescent tracers is utilized to evaluate and/or control a number of different process parameters unique to the cleaning of membrane separation, such as operational parameters, chemical parameters, mechanical parameters, the like and combinations thereof. The inert fluorescent tracer monitoring technique of the present invention can be performed with a high degree of sensitivity and selectivity with respect to the monitoring of process parameters specific to the cleaning of a membrane separation system. In this regard, the methods and systems of the present invention can be effectively utilized to optimize the performance of cleaning and, thus enhance the performance of the membrane separation process. Examples of such optimized performance include longer times between membrane cleanings, longer membrane life, verification of treatment chemical in the system, ability to operate at optimal recovery, and decreased energy costs due to better control of scaling, fouling and other system parameters.

To this end, in an embodiment of the present invention, a method of monitoring a cleaning process capable of cleaning a membrane separation system is provided. The method includes the steps of providing an inert fluorescent tracer and a cleaning solution; adding the inert fluorescent tracer and the cleaning solution to the membrane separation system; providing a fluorometer to detect the fluorescent signal of the inert fluorescent tracer in the membrane separation system; and using the fluorometer to determine an amount of the inert fluorescent tracer in the membrane separation system during the cleaning process.

In another embodiment, a method of cleaning a membrane separation system including a membrane capable of removing impurities from a feed stream is provided. The method includes the steps of providing an inert fluorescent tracer and a cleaning solution; flushing the membrane separation system; adding the inert fluorescent tracer and the cleaning solution to the membrane separation system; circulating the inert fluorescent tracer and the cleaning solution in the membrane separation system; rinsing the membrane separation system; providing a fluorometer to detect the fluorescent signal of the inert fluorescent tracer in the membrane separation system; using the fluorometer to measure an amount of the inert fluorescent tracer ranging from about 5 parts per trillion ("ppt") to about 1000 parts per million ("ppm"); and evaluating at least one process parameter specific to cleaning based on the amount of the inert fluorescent tracer that is measured.

In yet another embodiment, a cleaning system capable of cleaning a membrane separation system adapted for use in an industrial process is provided. The cleaning system includes an inert fluorescent tracer and a cleaning solution added to the membrane separation system during cleaning; a detection device capable of fluorometrically measuring an amount of the inert fluorescent tracer ranging from about 5 ppt to about 1000 ppm during cleaning of the membrane separation system wherein the detection device is capable of producing a signal indicative of the amount of inert tracer that is measured; and a controller capable of processing the signal to monitor cleaning of the membrane separation system.

It is, therefore, an advantage of the present invention to provide methods and systems that utilize inert fluorescent tracers to monitor and/or control the cleaning of membrane separation processes or systems.

Another advantage of the present invention is to provide methods and systems that utilize measurable amounts of inert tracers to improve the operational efficiency of the cleaning of membrane separation processes or systems.

A further advantage of the present invention is to provide methods and systems for monitoring parameters specific to the cleaning of membrane separation processes with selectivity, specificity and accuracy based on measurable amounts of inert tracers added during cleaning.

Yet another advantage of the present invention is to provide methods and systems for monitoring and/or controlling the cleaning of membrane separation processes adaptable for use in industrial water systems.

Still further an advantage of the present invention is to provide an improved performance specific to the cleaning of membrane separation processes or systems that utilize cross-flow and/or dead-end flow separation to remove impurities from a variety of suitable feed streams.

The benefits of this invention include the accurate determination of the system volume of a membrane separation system including the housings and associated piping, the accurate dosing of cleaning chemicals during system cleaning, and the assessment of rinse times for the system.

Additional features and advantages of the present invention are described in, and will be apparent in, the detailed description of the presently preferred embodiments.

DETAILED DESCRIPTION OF THE PRESENTLY PREFERRED EMBODIMENTS

The present invention provides methods and systems for monitoring and/or controlling the cleaning of membrane separation systems. More specifically, the methods and systems of the present invention can monitor and/or control the cleaning of membrane separation systems based on measurable amounts of inert fluorescent tracers which have been added during cleaning.

The methods and systems of the present invention can include a variety of different and suitable components, process steps, operating conditions and the like, for monitoring and/or controlling the cleaning of membrane separation processes or systems. In an embodiment, the membrane separation process of the present invention includes cross-flow and dead-end flow processes. During cross-flow processes, the feed stream can be treated in a flow direction that is substantially parallel to the membrane of the separation system. With respect to dead-end flow separation processes, the feed stream can be treated in a flow direction that is substantially perpendicular to the membrane of the separation system.

It should be appreciated that the present invention can be utilized with respect to a number of different types of membrane separation processes including, for example, cross flow processes, dead-end flow processes, reverse osmosis, ultrafiltration, microfiltration, nanofiltration, electrodialysis, electrodeionization, pervaporation, membrane extraction, membrane distillation, membrane stripping, membrane aeration and the like or combinations thereof. Reverse osmosis, ultrafiltration, microfiltration and nanofiltration are the preferred membrane separation processes.

In reverse osmosis, the feed stream is typically processed under cross flow conditions. In this regard, the feed stream flows substantially parallel to the membrane surface such that only a portion of the feed stream diffuses through the membrane as permeate. The cross flow rate is routinely high in order to provide a scouring action that lessens membrane surface fouling. This can also decrease concentration polarization effects (e.g., concentration of solutes in the reduced-turbulence boundary layer at the membrane surface, which can increase the osmotic pressure at the membrane and thus can reduce permeate flow). The concentration polarization effects can inhibit the feed stream water from passing through the membrane as permeate, thus decreasing the recovery ratio, e.g., the ratio of permeate to applied feed stream. A recycle loop(s) may be employed to maintain a high flow rate across the membrane surface.

Reverse osmosis processes can employ a variety of different types of membranes. Such commercial membrane element types include, without limitation, hollow fiber membrane elements, tubular membrane elements, spiral-wound membrane elements, plate and frame membrane elements, and the like, some of which are described in more detail in "The Nalco Water Handbook," Second Edition, Frank N. Kemmer ed., McGraw-Hill Book Company, New York, N.Y., 1988, incorporated hereinto, particularly Chapter 15 entitled "Membrane Separation". It should be appreciated that a single membrane element may be used in a given membrane filtration system, but a number of membrane elements can also be used depending on the industrial application.

A typical reverse osmosis system is described as an example of membrane filtration and more generally membrane separation. Reverse osmosis uses mainly spiral wound elements or modules, which are constructed by winding layers of semi-porous membranes with feed spacers and permeate water carriers around a central perforated permeate collection tube. Typically, the modules are sealed with tape and/or fiberglass over-wrap. The resulting construction has one channel which can receive an inlet flow. The inlet stream flows longitudinally along the membrane module and exits the other end as a concentrate stream. Within the module, water passes through the semi-porous membrane and is trapped in a permeate channel which flows to a central collection tube. From this tube it flows out of a designated channel and is collected.

In practice, membrane modules are stacked together, end to end, with inter-connectors joining the permeate tubes of the first module to the permeate tube of the second module, and so on. These membrane module stacks are housed in pressure vessels. Within the pressure vessel feed water passes into the first module in the stack, which removes a portion of the water as permeate water. The concentrate stream from the first membrane becomes the feed stream of the second membrane and so on down the stack. The permeate streams from all of the membranes in the stack are collected in the joined permeate tubes. Only the feed stream entering the first module, the combined permeate stream and the final concentrate stream from the last module in the stack are commonly monitored.

Within most reverse osmosis systems, pressure vessels are arranged in either "stages" or "passes." In a staged membrane system, the combined concentrate streams from a bank of pressure vessels are directed to a second bank of pressure vessels where they become the feed stream for the second stage. Commonly systems have 2 to 3 stages with successively fewer pressure vessels in each stage. For example, a system may contain 4 pressure vessels in a first stage, the concentrate streams of which feed 2 pressure vessels in a second stage, the concentrate streams of which in turn feed 1 pressure vessel in the third stage. This is designated as a "4:2:1" array. In a staged membrane configuration, the combined permeate streams from all pressure vessels in all stages are collected and used without further membrane treatment. Multi-stage systems are used when large volumes of purified water are required, for example for boiler feed water. The permeate streams from the membrane system may be further purified by ion exchange or other means.

In a multi-pass system, the permeate streams from each bank of pressure vessels are collected and used as the feed to the subsequent banks of pressure vessels. The concentrate streams from all pressure vessels are combined without further membrane treatment of each individual stream. Multi-pass systems are used when very high purity water is required, for example in the microelectronics or pharmaceutical industries.

It should be clear from the above examples that the concentrate stream of one stage of an RO system can be the feed stream of another stage. Likewise the permeate stream of a single pass of a multi-pass system may be the feed stream of a subsequent pass. A challenge in monitoring systems such as the reverse osmosis examples cited above is that there are a limited number of places where sampling and monitoring can occur, namely the feed, permeate and concentrate streams. In some, but not all, systems "inter-stage" sampling points allow sampling/monitoring of the first stage concentrate/second stage feed stream. Similar inter-pass sample points may be available on multi-pass systems as well.

In contrast to cross-flow filtration membrane separation processes, conventional filtration of suspended solids can be conducted by passing a feed fluid through a filter media or membrane in a substantially perpendicular direction. This effectively creates one exit stream during the service cycle. Periodically, the filter is backwashed by passing a clean fluid in a direction opposite to the feed, generating a backwash effluent containing species that have been retained by the filter. Thus conventional filtration produces a feed stream, a purified stream and a backwash stream. This type of membrane separation is typically referred to as dead-end flow separation and is typically limited to the separation of suspended particles greater than about one micron in size.

Cross-flow filtration techniques, on the other hand, can be used for removing smaller particles (generally about one micron in size or less), colloids and dissolved solutes. Such types of cross-flow membrane separation systems can include, for example, reverse osmosis, microfiltration, ultrafiltration, nanofiltration, electrodialysis or the like. Reverse osmosis can remove even low molecular weight dissolved species that are at least about 0.0001 to about 0.001 microns in minimum diameter, including, for example, ionic and nonionic species, low molecular weight molecules, water-soluble macromolecules or polymers, suspended solids, colloids, and such substances as bacteria and viruses.

In this regard, reverse osmosis is often used commercially to treat water that has a moderate to high (e.g., 500 ppm or greater) total dissolved solids ("TDS") content. Typically on order of from about 2 percent to about 5 percent of the TDS of a feed stream will pass through the membrane. Thus, in general the permeate may not be entirely free of solutes. In this regard, the TDS of reverse osmosis permeates may be too high for some industrial applications, such as use as makeup water for high pressure boilers. Therefore, reverse osmosis systems and other like membrane separation systems are frequently used prior to and in combination with an ion exchange process or other suitable process to reduce the TDS loading on the resin and to decrease the amount of hazardous material used and stored for resin regeneration, such as acids and sodium hydroxide.

Applicants have surprisingly discovered that a number of different process parameters specific to the cleaning of membrane separation, including, for example, operational parameters, chemical parameters, mechanical parameters, concentration of the cleaning solution, concentration of the treatment product including an anti-scalant, an anti-foulant, a biocide and mixtures thereof, the hold-up volume of the membrane separation system, like parameters and combinations thereof can be evaluated with a high degree of selectivity, specificity and accuracy such that the performance of the cleaning process and thus the membrane separation process can be effectively optimized.

It should be appreciated that the process parameters specific to the cleaning of membranes can vary greatly with respect to process parameters specific to the cleaning of other water systems. Based on these differences, a number of different factors and considerations must necessarily be taken into account when developing and/or implementing monitoring and/or controlling programs with respect to the cleaning of membrane separation systems as compared to the cleaning of the other water treatment processes. In this regard, inert fluorescent tracer monitoring as applied to cleaning membrane separation systems can vary greatly as applied to other water treatment systems.

As previously discussed, the methods and systems of the present invention employ inert fluorescent tracers to monitor and/or control the cleaning of membrane separation systems. In this regard, the amount of inert tracers measured during cleaning can be utilized as an indicator to monitor and/or control cleaning such that the performance of such systems can be optimized.

The term "inert," as used herein refers to an inert fluorescent tracer that is not appreciably or significantly affected by any other chemistry in the system, or by the other system parameters such as pH, temperature, ionic strength, redox potential, microbiological activity or biocide concentration. To quantify what is meant by "not appreciably or significantly affected", this statement means that an inert fluorescent compound has no more than a 10% change in its fluorescent signal, under severe conditions normally encountered in industrial water systems. Severe conditions normally encountered in industrial water systems are known to people of ordinary skill in the art of industrial water systems.

It should be appreciated that a variety of different and suitable inert tracers can be utilized in any suitable amount, number and application. For example, a single tracer can be used to evaluate a number of different membrane cleaning process parameters. However, the present invention can include the use of a number of different tracers each functioning as tracers for separate monitoring applications. In an embodiment, inert fluorescent tracer monitoring of the present invention can be conducted on a singular, intermittent or semi-continuous basis, and preferably the concentration determination of the tracer is conducted on-site to provide a rapid real-time determination.

An inert tracer must be transportable with the water of the membrane cleaning process and thus substantially, if not wholly, water-soluble therein at the concentration it is used, under the temperature and pressure conditions specific and unique to membrane cleaning. In other words, an inert tracer displays properties similar to a solute of the membrane separation process or system which is being cleaned. In an embodiment, it is preferred that the inert tracer of the present invention meet the following criteria:

1. Not be adsorbed by the membrane in any appreciable amount;

2. Not degrade the membrane or otherwise hinder its performance or alter its composition;

3. Be detectable on a continuous or semi-continuous basis and susceptible to concentration measurements that are accurate, repeatable and capable of being performed on any suitable process stream during cleaning;

4. Be substantially foreign to the chemical species that are normally present during the cleaning of membrane separation systems in which the inert tracer(s) may be used;

5. Be substantially impervious to interference from, or biasing by, the chemical species that are normally present during cleaning of membrane separation systems in which the inert tracer(s) may be used;

6. Be substantially impervious to any of its own potential specific or selective losses during cleaning of membrane separation systems;

7. Be compatible with all treatment agents employed in the water of the membrane separation systems in which the inert tracer(s) may be used, and thus in no way reduce the efficacy thereof;

8. Be compatible with all components of its formulation; and

9. Be relatively nontoxic and environmentally safe, not only within the environs during the cleaning of the membrane separation system in which it may be used, but also upon discharge therefrom.

It should be appreciated that the amount of inert tracer to be added during cleaning of the membrane separation system that is effective without being grossly excessive can vary with respect to a variety of factors including, without limitation, the monitoring method selected, the extent of background interference associated with the selected monitoring method, the magnitude of the expected inert tracer(s) concentration in the cleaning process stream, the monitoring mode (such as, an on-line continuous monitoring mode), and other similar factors. In an embodiment, the dosage of an inert tracer added during membrane cleaning includes an amount that is at least sufficient to provide a measurable concentration of at least about 5 ppt, and preferably at least about 1 parts per billion ("ppb") or about 5 ppb or higher, such as, up to about 100 ppm or about 200 ppm, or even as high as about 1000 ppm in any suitable process stream during cleaning. In an embodiment, the amount of tracer ranges from about 5 ppt to about 1000 ppm, preferably from about 1 ppb to about 50 ppm, more preferably from about 5 ppb to about 50 ppb.

In an embodiment, the inert tracer can be added during cleaning of the membrane separation system as a component of a formulation, rather than as a separate component, such as a dry solid or neat liquid. The inert tracer formulation or product may include an aqueous solution or other substantially homogeneous mixture that disperses with reasonable rapidity during cleaning of the membrane separation system to which it is added. In this regard, the inert tracer's concentration may be correlated to the concentration of a product. In an embodiment, the product or formulation can include any suitable cleaning agent (as discussed below) which is added to clean the membrane.

A variety of different and suitable types of compounds can be utilized as inert fluorescent tracers. In an embodiment, the inert fluorescent compounds can include, for example, the following compounds:

3,6-acridinediamine, N,N,N',N'-tetramethyl-, monohydrochloride, also known as Acridine Orange (CAS Registry No. 65-61-2), 2-anthracenesulfonic acid sodium salt (CAS Registry No. 16106-40-4), 1,5-anthracenedisulfonic acid (CAS Registry No. 61736-91-2) and salts thereof, 2,6-anthracenedisulfonic acid (CAS Registry No. 61736-95-6) and salts thereof, 1,8-anthracenedisulfonic acid (CAS Registry No. 61736-92-3) and salts thereof, anthra[9,1,2-cde]benzo[rst]pentaphene-5,10-diol, 16,17-dimethoxy-, bis(hydrogen sulfate), disodium salt, also known as Anthrasol Green IBA (CAS Registry No. 2538-84-3, aka Solubilized Vat Dye), bathophenanthrolinedisulfonic acid disodium salt (CAS Registry No. 52746-49-3), amino 2,5-benzene disulfonic acid (CAS Registry No. 41184-20-7), 2-(4-aminophenyl)-6-methylbenzothiazole (CAS Registry No. 92-36-4), 2-(4-aminophenyl)-6-methylbenzothiazole (CAS Registry No. 92-36-4), 1H-benz[de]isoquinoline-5-sulfonic acid, 6-amino-2,3-dihydro-2-(4-methylphenyl)-1,3-dioxo-, monosodium salt, also known as Brilliant Acid Yellow 8G (CAS Registry No. 2391-30-2, aka Lissamine Yellow FF, Acid Yellow 7), phenoxazin-5-ium, 1-(aminocarbonyl)-7-(diethylamino)-3,4-dihydroxy-, chloride, also known as Celestine Blue (CAS Registry No. 1562-90-9), benzo[a]phenoxazin-7-ium, 5,9-diamino-, acetate, also known as cresyl violet acetate (CAS Registry No. 10510-54-0), 4-dibenzofuransulfonic acid (CAS Registry No. 42137-76-8), 3-dibenzofuransulfonic acid (CAS Registry No. 215189-98-3), 1-ethylquinaldinium iodide (CAS Registry No. 606-53-3), fluorescein (CAS Registry No. 2321-07-5), fluorescein, sodium salt (CAS Registry No. 518-47-8, aka Acid Yellow 73, Uranine), Keyfluor White ST (CAS Registry No. 144470-48-4, aka Flu. Bright 28), benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-, tetrasodium salt, also known as Keyfluor White CN (CAS Registry No. 16470-24-9), C.I. Fluorescent Brightener 230, also known as Leucophor BSB (CAS Registry No. 68444-86-0), benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-, tetrasodium salt, also known as Leucophor BMB (CAS Registry No. 16470-24-9, aka Leucophor U, Flu. Bright. 290), 9,9'-biacridinium, 10,10'-dimethyl-, dinitrate, also known as Lucigenin (CAS Registry No. 2315-97-1, aka bis-N-methylacridinium nitrate), 1-deoxy-1-(3,4-dihydro-7,8-dimethyl-2,4-dioxobenzo[g] pteridin-10(2H)-yl)-D-ribitol, also known as Riboflavin or Vitamin B2 (CAS Registry No. 83-88-5), mono-, di-, or tri-sulfonated napthalenes, including but not limited to 1,5-naphthalenedisulfonic acid, disodium salt (hydrate) (CAS Registry No. 1655-29-4, aka 1,5-NDSA hydrate), 2-amino-1-naphthalenesulfonic acid (CAS Registry No. 81-16-3), 5-amino-2-naphthalenesulfonic acid (CAS Registry No. 119-79-9), 4-amino-3-hydroxy-1-naphthalenesulfonic acid (CAS Registry No. 90-51-7), 6-amino-4-hydroxy-2-naphthalenesulfonic acid (CAS Registry No. 116-63-2), 7-amino-1,3-naphthalenesulfonic acid, potassium salt (CAS Registry No. 79873-35-1), 4-amino-5-hydroxy-2,7-naphthalenedisulfonic acid (CAS Registry No. 90-20-0), 5-dimethylamino-1-naphthalenesulfonic acid (CAS Registry No. 4272-77-9), 1-amino-4-naphthalene sulfonic acid (CAS Registry No. 84-86-6), 1-amino-7-naphthalene sulfonic acid (CAS Registry No. 119-28-8), and 2,6-naphthalenedicarboxylic acid, dipotassium salt (CAS Registry No. 2666-06-0), 3,4,9,10-perylenetetracarboxylic acid (CAS Registry No. 81-32-3), C.I. Fluorescent Brightener 191, also known as Phorwite CL (CAS Registry No. 12270-53-0), C.I. Fluorescent Brightener 200, also known as Phorwite BKL (CAS Registry No. 61968-72-7), benzenesulfonic acid, 2,2'-(1,2-ethenediyl)bis[5-(4-phenyl-2H-1,2,3-triazol-2-yl)-, dipotassium salt, also known as Phorwite BHC 766 (CAS Registry No. 52237-03-3), benzenesulfonic acid, 5-(2H-naphtho[1,2-d]triazol-2-yl)-2-(2-phenylethenyl)-, sodium salt, also known as Pylaklor White S-15A (CAS Registry No. 6416-68-8), 1,3,6,8-pyrenetetrasulfonic acid, tetrasodium salt (CAS Registry No. 59572-10-0), pyranine, (CAS Registry No. 6358-69-6, aka 8-hydroxy-1,3,6-pyrenetrisulfonic acid, trisodium salt), quinoline (CAS Registry No. 91-22-5), 3H-phenoxazin-3-one, 7-hydroxy-, 10-oxide, also known as Rhodalux (CAS Registry No. 550-82-3), xanthylium, 9-(2,4-dicarboxyphenyl)-3,6-bis(diethylamino)-, chloride, disodium salt, also known as Rhodamine WT (CAS Registry No. 37299-86-8), phenazinium, 3,7-diamino-2,8-dimethyl-5-phenyl-, chloride, also known as Safranine O (CAS Registry No. 477-73-6), C.I. Fluorescent Brightener 235, also known as Sandoz CW (CAS Registry No. 56509-06-9), benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-, tetrasodium salt, also known as Sandoz CD (CAS Registry No. 16470-24-9, aka Flu. Bright. 220), benzenesulfonic acid, 2,2'-(1,2-ethenediyl)bis[5-[[4-[(2-hydroxypropyl)amino]-6-(phenylamino)-1,3,5-triazin-2-yl] amino]-, disodium salt, also known as Sandoz TH-40 (CAS Registry No. 32694-95-4), xanthylium, 3,6-bis(diethylamino)-9-(2,4-disulfophenyl)-, inner salt, sodium salt, also known as Sulforhodamine B (CAS Registry No. 3520-42-1, aka Acid Red 52), benzenesulfonic acid, 2,2'-(1,2-ethenediyl)bis[5-[[4-[(aminomethyl)(2-hydroxyethyl)amino]-6-(phenylamino)-1,3,5-triazin-2-yl]amino]-, disodium salt, also known as Tinopal 5BM-GX (CAS Registry No. 169762-28-1), Tinopol DCS (CAS Registry No. 205265-33-4), benzenesulfonic acid, 2,2'-([1,1'-biphenyl]-4,4'-diyldi-2,1-ethenediyl)bis-, disodium salt also known as Tinopal CBS-X (CAS Registry No. 27344-41-8), benzenesulfonic acid, 5-(2H-naphtho[1,2-d]triazol-2-yl)-2-(2-phenylethenyl)-, sodium salt, also known as Tinopal RBS 200, (CAS Registry No. 6416-68-8), 7-benzothiazolesulfonic acid, 2,2'-(1-triazene-1,3-diyldi-4,1-phenylene)bis[6-methyl-, disodium salt, also known as Titan Yellow (CAS Registry No. 1829-00-1, aka Thiazole Yellow G), and all ammonium, potassium and sodium salts thereof, and all like agents and suitable mixtures thereof.

Preferred tracers include:

1-deoxy-1-(3,4-dihydro-7,8-dimethyl-2,4-dioxobenzo[g] pteridin-10(2H)-yl)-D-ribitol, also known as Riboflavin or Vitamin B2 (CAS Registry No. 83-88-5), fluorescein (CAS Registry No. 2321-07-5), fluorescein, sodium salt (CAS Registry No. 518-47-8, aka Acid Yellow 73, Uranine), 2-anthracenesulfonic acid sodium salt (CAS Registry No. 16106-40-4), 1,5-anthracenedisulfonic acid (CAS Registry No. 61736-91-2) and salts thereof, 2,6-anthracenedisulfonic acid (CAS Registry No. 61736-95-6) and salts thereof, 1,8-anthracenedisulfonic acid (CAS Registry No. 61736-92-3) and salts thereof, mono-, di-, or tri-sulfonated napthalenes, including but not limited to 1,5-naphthalenedisulfonic acid, disodium salt (hydrate) (CAS Registry No. 1655-29-4, aka 1,5-NDSA hydrate), 2-amino-1-naphthalenesulfonic acid (CAS Registry No. 81-16-3), 5-amino-2-naphthalenesulfonic acid (CAS Registry No. 119-79-9), 4-amino-3-hydroxy-1-naphthalenesulfonic acid (CAS Registry No. 90-51-7), 6-amino-4-hydroxy-2-naphthalenesulfonic acid (CAS Registry No. 116-63-2), 7-amino-1,3-naphthalenesulfonic acid, potassium salt (CAS Registry No. 79873-35-1), 4-amino-5-hydroxy-2,7-naphthalenedisulfonic acid (CAS Registry No. 90-20-0), 5-dimethylamino-1-naphthalenesulfonic acid (CAS Registry No. 4272-77-9), 1-amino-4-naphthalene sulfonic acid (CAS Registry No. 84-86-6), 1-amino-7-naphthalene sulfonic acid (CAS Registry No. 119-28-8), and 2,6-naphthalenedicarboxylic acid, dipotassium salt (CAS Registry No. 2666-06-0), 3,4,9,10-perylenetetracarboxylic acid (CAS Registry No. 81-32-3), C.I. Fluorescent Brightener 191, also known as, Phorwite CL (CAS Registry No. 12270-53-0), C.I. Fluorescent Brightener 200, also known as Phorwite BKL (CAS Registry No. 61968-72-7), benzenesulfonic acid, 2,2'-(1,2-ethenediyl)bis[5-(4-phenyl-2H-1,2,3-triazol-2-yl)-, dipotassium salt, also known as Phorwite BHC 766 (CAS Registry No. 52237-03-3), benzenesulfonic acid, 5-(2H-naphtho[1,2-d]triazol-2-yl)-2-(2-phenylethenyl)-, sodium salt, also known as Pylaklor White S-15A (CAS Registry No. 6416-68-8), 1,3,6,8-pyrenetetrasulfonic acid, tetrasodium salt (CAS Registry No. 59572-10-0), pyranine, (CAS Registry No. 6358-69-6, aka 8-hydroxy-1,3,6-pyrenetrisulfonic acid, trisodium salt), quinoline (CAS Registry No. 91-22-5), 3H-phenoxazin-3-one, 7-hydroxy-, 10-oxide, also known as Rhodalux (CAS Registry No. 550-82-3), xanthylium, 9-(2,4-dicarboxyphenyl)-3,6-bis(diethylamino)-, chloride, disodium salt, also known as Rhodamine WT (CAS Registry No. 37299-86-8), phenazinium, 3,7-diamino-2,8-dimethyl-5-phenyl-, chloride, also known as Safranine O (CAS Registry No. 477-73-6), C.I. Fluorescent Brightener 235, also known as Sandoz CW (CAS Registry No. 56509-06-9), benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-, tetrasodium salt, also known as Sandoz CD (CAS Registry No. 16470-24-9, aka Flu. Bright. 220), benzenesulfonic acid, 2,2'-(1,2-ethenediyl)bis[5-[[4-[(2-hydroxypropyl)amino]-6-(phenylamino)-1,3,5-triazin-2-yl]amino]-, disodium salt, also known as Sandoz TH-40 (CAS Registry No. 32694-95-4), xanthylium, 3,6-bis(diethylamino)-9-(2,4-disulfophenyl)-, inner salt, sodium salt, also known as Sulforhodamine B (CAS Registry No. 3520-42-1, aka Acid Red 52), benzenesulfonic acid, 2,2'-(1,2-ethenediyl)bis[5-[[4-[(aminomethyl)(2-hydroxyethyl)amino]-6-(phenylamino)-1,3,5-triazin-2-yl]amino]-, disodium salt, also known as Tinopal 5BM-GX (CAS Registry No. 169762-28-1), Tinopol DCS (CAS Registry No. 205265-33-4), benzenesulfonic acid, 2,2'-([1,1'-biphenyl]-4,4'-diyldi-2,1-ethenediyl)bis-, disodium salt, also known as Tinopal CBS-X (CAS Registry No. 27344-41-8), benzenesulfonic acid, 5-(2H-naphtho[1,2-d]triazol-2-yl)-2-(2-phenylethenyl)-, sodium salt, also known as Tinopal RBS 200, (CAS Registry No. 6416-68-8), 7-benzothiazolesulfonic acid, 2,2'-(1-triazene-1,3-diyldi-4,1-phenylene)bis[6-methyl-, disodium salt, also known as Titan Yellow (CAS Registry No. 1829-00-1, aka Thiazole Yellow G), and all ammonium, potassium and sodium salts thereof, and all like agents and suitable mixtures thereof.

The most preferred fluorescent inert tracers of the present invention include 1,3,6,8-pyrenetetrasulfonic acid tetrasodium salt (CAS Registry No. 59572-10-0); 1,5-naphthalenedisulfonic acid disodium salt (hydrate) (CAS Registry No. 1655-29-4, aka 1,5-NDSA hydrate); xanthylium, 9-(2,4-dicarboxyphenyl)-3,6-bis(diethylamino)-, chloride, disodium salt, also known as Rhodamine WT (CAS Registry No. 37299-86-8); 1-deoxy-1-(3,4-dihydro-7,8-dimethyl-2,4-dioxobenzo[g]pteridin-10(2H)-yl)-D-ribitol, also known as Riboflavin or Vitamin B2 (CAS Registry No. 83-88-5); fluorescein (CAS Registry No. 2321-07-5); fluorescein, sodium salt (CAS Registry No. 518-47-8, aka Acid Yellow 73, Uranine); 2-anthracenesulfonic acid sodium salt (CAS Registry No. 16106-40-4); 1,5-anthracenedisulfonic acid (CAS Registry No. 61736-91-2) and salts thereof; 2,6-anthracenedisulfonic acid (CAS Registry No. 61736-95-6) and salts thereof; 1,8-anthracenedisulfonic acid (CAS Registry No. 61736-92-3) and salts thereof; and mixtures thereof. The fluorescent tracers listed above are commercially available from a variety of different chemical supply companies.

In addition to the tracers listed above, those skilled in the art will recognize that salts using alternate counter ions may be used. Thus, for example, anionic tracers which have $Na^+$ as a counter ion could also be used in forms where the counter ion is chosen from the list of: $K^+$, $Li^+$, $NH_4^+$, $Ca^{+2}$, $Mg^{+2}$ or other appropriate counter ions. In the same way, cationic tracers may have a variety of counter ions, for example: $Cl^-$, $SO_4^{-2}$, $PO_4^{-3}$, $HPO_4^{-2}$; $H_2PO_4^-$; $CO_3^{-2}$; $HCO_3^-$; or other appropriate counter ions.

Modifications of these tracers to control molecular weight or physical size within a desirable size range by, for example, affixing them to an inert polymeric molecule, incorporating them into a fluorescent microsphere or adding additional chemical moieties in the side chains of the molecules should be obvious to those skilled in the art. Such modifications are included herein.

As previously discussed, the inert tracer(s) is measured or detected to evaluate the performance during cleaning of the membrane separation system. A determination of the presence of an inert fluorescent tracer and the concentration thereof in any suitable process stream during membrane cleaning can be made when the concentration of the inert tracer in the process stream of a membrane separation system is several parts per million or less, even as low as parts per billion as previously discussed.

At times, it may be desired to employ a number of inert tracers. In this regard, it may be desired to use a number of inert tracers to monitor, for example, inert tracer-specific losses, variances, like conditions or combinations thereof. Such separate and distinct inert tracers can each be detected and quantified in a single process stream despite both being inert fluorescent tracers provided that their respective wavelengths of emission do not interfere with one another. Thus, concurrent analyses for multiple inert tracers is possible by selection of inert tracers that have appropriate spectral characteristics.

The inert tracers of the present invention can be detected by utilizing a variety of different and suitable techniques. For example, fluorescence emission spectroscopy on a substantially continuous basis, at least over a given time period, is one of the preferred analytical techniques according to an embodiment of the present invention. One method for the continuous on-stream measuring of chemical tracers by fluorescence emission spectroscopy and other analysis methods is described in U.S. Pat. No. 4,992,380, B. E. Moriarty, J. J. Hickey, W. H. Hoy, J. E. Hoots and D. A. Johnson, issued Feb. 12, 1991, incorporated hereinto by reference.

In general, for most fluorescence emission spectroscopy methods having a reasonable degree of practicality, it is preferable to perform the analysis without isolating in any manner the tracer(s). Thus, there may be some degree of background fluorescence in the influent/feedwater and/or concentrate on which the fluorescence analysis is conducted. This background fluorescence may come from chemical compounds in the membrane separation system and/or cleaning thereof that are unrelated to the membrane separation process or system cleaning of the present invention.

In instances where the background fluorescence is low, the relative measurable intensities (measured against a standard fluorescent compound at a standard concentration and assigned a relative intensity, for instance 100) of the fluorescence of the inert tracer versus the background can be very high, for instance a ratio of 100/10 or 500/10 when certain combinations of excitation and emission wavelengths are employed even at low fluorescent compound concentrations, and such ratios would be representative of a "relative fluorescence" (under like conditions) of respectively 10 and 50. In an embodiment, the excitation/emission wavelengths and/or the amount of inert tracer employed are selected to provide a relative fluorescence of at least about 5 or about 10 for the given background fluorescence anticipated.

Examples of fluorometers that may be used in the practice of this invention include the TRASAR® 3000 and TRASAR® 8000 fluorometers (available from Ondeo Nalco Company of Naperville, Ill.); the Hitachi F-4500 fluorometer (available from Hitachi through Hitachi Instruments Inc. of San Jose, Calif.); the JOBIN YVON FluoroMax-3 "SPEX" fluorometer (available from JOBIN YVON Inc. of Edison, N.J.); and the Gilford Fluoro-IV spectrophotometer or the SFM 25 (available from Bio-tech Kontron through Research Instruments International of San Diego, Calif.). It should be appreciated that the fluorometer list is not comprehensive and is intended only to show examples of fluorometers. Other commercially available fluorometers and modifications thereof can also be used in this invention.

It should be appreciated that a variety of other suitable analytical techniques may be utilized to measure the amount of inert tracers during cleaning of membrane separation process. Examples of such techniques include combined HPLC-fluorescence analysis, colorimetry analysis, ion selective electrode analysis, transition metal analysis and the like.

For example, the combination of high-pressure liquid chromatography ("HPLC") and fluorescence analyses of inert fluorescent tracers can be utilized to detect measurable amounts of the inert tracer during cleaning of the membrane separation system of the present invention, particularly when very low levels of the inert tracer is used or the background fluorescence encountered would otherwise interfere with the efficacy of fluorescence analysis. The HPLC-fluorescence analysis method allows the inert tracer compound to be separated from the fluid matrix and then the inert tracer concentration can be measured.

The HPLC method can also be effectively employed to separate an inert tracer compound from a fluid matrix for the purposes of then employing an inert tracer-detection method other than the fluorescence analysis. An example of this type of chromatographic technique is described in "Techniques in Liquid Chromatography", C. F. Simpson ed., John Wiley & Sons, New York, pp. 121–122, 1982, incorporated herein by reference, and "Standard Method For The Examination Of Water And Wastewater", 17th Edition, American Public Health Association, pp. 6-9 to 6-10, 1989, incorporated herein by reference.

With respect to colorimetry analysis, colorimetry and/or spectrophotometry may be employed to detect and/or quantify an inert chemical tracer. Colorimetry is a determination of a chemical specie from its ability to absorb ultraviolet or visible light. Colorimetric analysis techniques and the equipment that may be employed therefor are described in U.S. Pat. No. 4,992,380, B. E. Moriarity, J. J. Hickey, W. H. Hoy, J. E. Hoots and D. A. Johnson, issued Feb. 12, 1991, incorporated herein by reference.

With respect to ion selective electrode analysis, an ion selective electrode may be used to determine the concentration of an inert chemical tracer through the direct potentiometric measurement of specific ionic tracers in aqueous systems. An example of an ion selective electrode tracer monitoring technique is described in U.S. Pat. No. 4,992,380, B. E. Moriarity, J. J. Hickey, W. H. Hoy, J. E. Hoots and D. A. Johnson, issued Feb. 12, 1991, incorporated herein by reference.

It should be appreciated that analytical techniques for detecting and/or quantifying the presence and/or concentration of a chemical specie without isolation thereof are within an evolving technology. In this regard, the above survey of analytical techniques suitable for use in detecting measurable amounts of the inert tracer during cleaning of the membrane separation system of the present invention may presently not even be exhaustive. Thus, analytical techniques equivalent to the above for purposes of the present invention may likely be developed in the future.

The methods and systems of the present invention can include a variety of different and suitable components, process steps, operating conditions and the like, for monitoring and/or controlling the cleaning of membrane separation systems. In an embodiment, the membrane cleaning methods of the present invention include the steps of providing an inert fluorescent tracer and a cleaning solution; adding the inert fluorescent tracer and cleaning solution to the membrane separation system; providing a fluorometer to detect the fluorescent signal of the inert fluorescent tracer in the membranes separation system; and using the fluorometer to determine an amount of the inert fluorescent tracer in the membrane separation system during the cleaning process.

As previously discussed, a variety of different and suitable types and amounts of inert fluorescent tracers can be utilized. It should be appreciated that any suitable type and amount of cleaning agent can also be utilized. In general, the cleaning agent is utilized to remove deposits of sealants, foulants, treatment agents, solutes and other impurities that remain within the membrane separation system, particularly deposits on the membrane.

The cleaning agent can be in any suitable form, preferably in a liquid form as applied during cleaning. The cleaning agents, whether in dry or liquid form, are typically diluted with water to make a cleaning solution. The types of cleaning agents may vary depending on the application, for example, the type of membrane that is being cleaned. In this regard, the cleaners can be added at a pH level including a high, moderate and low level. In an embodiment, the high pH level ranges from about 8 to about 12; the moderate pH level ranges from about 6 to about 8; and the low pH level ranges from about 3 to about 6.

In an embodiment, the cleaners added at high pH levels include, for example, any suitable high pH surfactant formulations or the like; the cleaners added at moderate pH levels include, for example, any suitable moderate pH surfactant formulations or the like; and the cleaners added at low pH levels include, for example, any suitable weak organic acid or combination thereof, such as phosphoric acid, citric acid, the like and buffered versions thereof. Other suitable cleaning agents include, for example, strong acids, including hydrochloric acid, which are diluted to a suitable concentration prior to use; chelants, such as EDTA; and biocides, preferably non-oxidizing biocides. It should be appreciated that the cleaning agents can be added to the membrane cleaning process in any suitable amount.

As previously discussed, the membrane cleaning process of the present invention can include a variety and number of suitable process steps and components. In an embodiment, the membrane cleaning process can include the step of flushing the membrane separation system prior to adding the inert fluorescent tracer and the cleaning solution. The membrane separation system of the present invention can be flushed in any suitable way, such as with an aqueous stream of permeate quality. After flushing, the inert tracer and cleaning solution can be added together, separately and/or as a single formulation, to the cleaning process. Once added, the inert tracer and cleaning solution are circulated through the membrane separation system in any suitable way.

In an embodiment, the inert tracer and/or cleaning solution can be added to a cleaning tank prior to addition to the membrane separation system. The cleaning tank and/or a feed system containing cleaning chemicals can be coupled to the membrane separation system including the membrane housings and associated piping in any suitable way such that cleaning can be conducted while the membrane separation system is on-line. Alternatively, the membrane separation system can be taken off-line and at least a portion thereof cleaned (e.g., a single stage or pass). This method is known as "Clean-in-Place" ("CIP"). A CIP setup typically includes a tank for mixing the cleaner (with optional heater), a low pressure pump, and a cartridge filter. Alternatively, individual membrane elements can be cleaned in a single element cleaning skid equipped with its own CIP system.

In an embodiment, the membrane cleaning process of the present invention can include the step of rinsing the membrane after the inert tracer and cleaning solution have been circulated during cleaning. The rinsing step can be utilized to remove any amount of the inert tracer, cleaning solution, membrane separation process contaminant or impurity deposits, the like or combinations thereof. In an embodiment, the rinsing step can include the rinsing with an aqueous stream of permeate quality.

It should be appreciated that the membrane cleaning process or system of the present invention can include any variety and number of suitable other components and process steps. For example, the membrane cleaning process of the claimed invention can include the step of soaking the membrane separation system (e.g., the membrane) in the solution of the cleaning agent and inert tracer for a suitable period of time subsequent to the circulation step. The soaking step can provide an additional level of cleaning that can facilitate the cleaning process.

In an embodiment, the present invention includes a controller (not shown) to monitor and/or control the performance of the membrane separation cleaning process based on the measurable amount of inert fluorescent tracer(s). The controller can be configured and/or adjusted in a variety of different and suitable ways.

For example, the controller can be coupled with a detection device (not shown) to process a detection signal (e.g., filter noise from the signal) in order to enhance the detection of the inert tracer. Further, the controller can be adjusted to communicate with other components of the membrane cleaning system. The communication can be either hard wired (e.g., electrical communication cable), a wireless communication (e.g., wireless RF interface), a pneumatic interface or the like.

In an embodiment, the membrane cleaning process of the present invention can be utilized to monitor with a high degree of selectivity, sensitivity, responsiveness and accuracy based on the measurable amount of inert tracer a number of different process parameters specific to membrane cleaning. The parameters include, for example, operational parameters; chemical parameters; mechanical parameters; a hold-up volume of the membrane cleaning process and its effects on the concentration of the cleaning agent; the concentration of the cleaning agent during various stages of cleaning; such as, initial feed, circulation, soaking and/or rinsing; like parameters; or combinations thereof. With the monitoring capabilities based on the inert tracer detection, the present invention can controllably adjust a variety of different cleaning process conditions including, for example, the dosage of cleaning agents, rinse rates, flushing agents, the like or combinations thereof to optimize the cleaning performance.

It should be appreciated that the fluorescent monitoring technique of the present invention can be utilized to monitor the level of treatment agents that may remain in the membrane separation system. By "treatment chemicals and/or agents" is meant without limitation treatment chemicals that enhance membrane-separation process performance, antiscalants that retard/prevent membrane scale deposition, antifoulants that retard/prevent membrane fouling, biodispersants, microbial-growth inhibiting agents, such as biocides and cleaning chemicals that remove membrane deposits.

"Deposits" is meant herein to refer to material that forms and/or collects on surfaces of a membrane. The "amount" or "concentration" of inert tracer is meant herein to refer to the concentration of the inert tracer in the specified fluid in terms of weight of the inert tracer per unit volume of the fluid, or weight of the inert tracer per unit weight of the fluid, or some characteristic of the inert tracer that is proportional to its concentration in the fluid and can be correlated to a numerical value of the inert tracer concentration in the fluid (whether or not that correlation conversion is calculated), and can be a value of zero or substantially zero. Thus, the process of the present invention includes the detection of the absence of such chemical species, at least to the limitations of the analytical method employed.

In an embodiment, the inert tracer selected is not a visible dye, that is, the inert tracer is a chemical specie that does not have a strong absorption of electromagnetic radiation in the visible region, which extends from about 4000 Angstroms to about 7000 Angstroms (from about 400 nanometers ("nm") to about 700 nm). Preferably the tracer is chosen from a class of materials which are excited by absorption of light and product fluorescent light emission, where the excitation and emission light occurs at any point within the far ultraviolet to near infrared spectral regions (wavelengths from 200–800 nm). The relative fluorescence intensity of the inert tracer must be such that it is detectable in the amounts specified by product formulations (typically 2–10 ppb as active fluorophore when dosed into the feed water stream of a device).

Alternatively, when the tracer dye does have strong adsorbtions in the visible spectrum, it is used in concentrations such that it is not detectable to the naked eye. Such embodiments may be preferred, for instance, when a membrane's percent rejection of the tracer is less than 100 percent, and it is desirable to produce a permeate free of color.

In some instances, it may be preferable to chose a fluorophore which emits visible fluorescent light when excited by UV light. This may be preferred when visual detection and/or photographic or other imaging of the system is desired.

It should be appreciated that the present invention is applicable to cleaning membranes in any suitable industries that can employ membrane separation processes. For example, the different types of industrial processes in which the method of the present invention can be applied generally include raw water processes, waste water processes, industrial water processes, municipal water treatment, food and beverage processes, pharmaceutical processes, electronic manufacturing, utility operations, pulp and paper processes, mining and mineral processes, transportation-related processes, textile processes, plating and metal working processes, laundry and cleaning processes, leather and tanning processes, and paint processes.

In particular, food and beverage processes can include, for example, dairy processes relating to the production of cream, low-fat milk, cheese, specialty milk products, protein isolates, lactose manufacture, whey, casein, fat separation, and brine recovery from salting cheese; uses relating to the beverage industry including, for example, fruit juice, clarification, concentration or deacidification, alcoholic beverage clarification, alcohol removal for low-alcohol content beverages, process water; and uses relating to sugar refining, vegetable protein processing, vegetable oil production/processing, wet milling of grain, animal processing (e.g., red meat, eggs, gelatin, fish and poultry), reclamation of wash waters, food processing waste and the like.

Membrane cleaning is required in a variety of industrial water applications, which include, but are not limited to, boiler water production, process water purification and recycle/reuse, softening of raw water, treatment of cooling water blow-down, reclamation of water from papermaking processes, desalinization of sea and brackish water for industrial and municipal use, drinking/raw/surface water purification including, for example, the use of membranes to exclude harmful micro-organisms from drinking water, polishing of softened water, membrane bio-reactors, mining and mineral process waters.

Examples of waste water treatment applications with respect to the inert tracer monitoring methods of the present invention include, for example, industrial waste water treatment, biological waste treatment systems, removal of heavy metal contaminants, polishing of tertiary effluent water, oily waste waters, transportation-related processes (e.g., tank car wash water), textile waste (e.g., dye, adhesives, size, oils for wool scouring, fabric finishing oils), plating and metal working waste, laundries, printing, leather and tanning, pulp and paper (e.g., color removal, concentration of dilute spent sulfite liquor, lignin recovery, recovery of paper coatings), chemicals (e.g., emulsions, latex, pigments, paints, chemical reaction by-products), municipal waste water treatment (e.g., sewage, industrial waste).

Other examples of membrane cleaning in industrial applications include, for example, semiconductor rinse water processes, production of water for injection, pharmaceutical water including water used in enzyme production/recovery and product formulation, and electro-coat paint processing.

EXAMPLES

The following examples are intended to be illustrative of the present invention and to teach one of ordinary skill how to make and use the invention. These examples are not intended to limit the invention or its protection in any way.

Example 1

A test was conducted to demonstrate that the present invention can be utilized to calculate the hold-up volume and evaluate the dilution effects thereof with respect to a cleaner solution based on a measurable amount of an inert tracer added during cleaning.

A cleaning solution was prepared by adding 30 g of a suitable cleaner (PermaClean PC-67 available from Ondeo Nalco Company of Naperville, Ill.) to 20 L of water in order to make a bulk cleaning solution that included about 0.15% of the cleaner by weight. An inert tracer (1,3,6,8-pyrenetetrasulfonic acid, tetrasodium salt (PTSA)), was added to the bulk solution. Fluorescence measurement of the cleaning tank bulk solution (using a Hitachi F-4500) indicated that about 128 ppb of the tracer were present.

The cleaning solution was sent to a reverse osmosis ("RO") membrane separation unit containing four 4-inch by 40-inch Osmonics spiral wound composite membranes arranged in a 2:1:1 array, where it was diluted with the standing water in the membranes, pressure vessels and associated piping. After sufficient mixing, the cleaner solution was sampled and found to contain 42.5 ppb of the tracer. The volume of the RO system and associated piping was calculated as follows:

$$(C1)(V1)=(C2)(V2)$$

where C1 is the concentration of the bulk cleaning solution before mixing; V1 is the volume of the cleaning solution before mixing; C2 is the concentration of the cleaning solution after mixing with the hold-up volume from the RO system; and V2 is the final volume of the cleaning solution. The hold-up volume can be calculated as follows:

$$(128 \text{ ppb})(20\text{L})=(42.5 \text{ ppb})(\text{total volume in L})$$

Total volume in L=60L $$\text{Hold-up (RO system) volume}=\text{total volume}-\text{volume of bulk cleaning solution}$$

Hold up (RO system) volume=60L−20L=40L.

Likewise, the final concentration of the cleaning solution may be calculated from the same equation where C1 and V1 are the initial concentration and volume of the cleaner and V2 is the total volume of the diluted solution (bulk cleaner plus hold-up volume of the RO system). C2 is the final concentration of the dilute cleaner.

$$(20\text{L})(0.15\%)=(60\text{L})(\text{diluted cleaner concentration})$$

Diluted cleaner concentration=0.05%

As demonstrated, the present invention can be utilized to calculate the hold-up volume with a high degree of accuracy and immediacy based on the measurable amount of the inert tracer in the cleaning system. This can be utilized to ensure that the proper cleaner dosage is obtained after dilution effects. In this regard, the present invention can be configured to controllably adjust the dosage of cleaner to account for the dilution effects due to the hold-up volume. Thus, membrane cleaning performance can be enhanced.

Example 2

A series of tests were conducted to demonstrate that that present invention can be utilized to determine an endpoint of cleaning based on the monitoring of a measurable amount of an inert fluorescent tracer(s) in the cleaning system.

In this example, a reverse osmosis system (as described above in Example 1) was cleaned in accordance with an embodiment of the present invention. A cleaning solution was prepared in the CIP tank by adding 300 g PermaClean PC-99 to 20 L of RO permeate water to make a bulk cleaning solution that included about 1.5% of cleaner by weight. 2 mL of a solution containing approximately 0.1% by weight of an inert tracer (1,3,6,8-pyrenetetrasulfonic acid, tetrasodium salt (PTSA)), were added to the cleaning tank. After circulating in the reverse osmosis system for approximately one hour, the cleaner solution contained a measurable amount of inert fluorescent tracer in the water. The concentration of the tracer in the cleaning solution (measured with a Hitachi F-4500 fluorometer) was 92 ppb. Table 1 below identifies the concentration of the tracer in the rinsate over time.

TABLE 1

| Rinse Time (minutes) | Tracer Concentration (ppb) | Percentage of Tracer Remaining |
|---|---|---|
| 0 | 92 | 100 |
| 1 | 28.8 | 31.3 |
| 3 | 16.6 | 18.0 |
| 5 | 10.1 | 11.0 |
| 10 | 0.47 | 0.5 |
| 15 | Non-detectable | 0.0 |

As demonstrated in Table 1, the monitoring of the inert tracer can be utilized to indicate when the rinsing stage is complete (e.g., about 15 minutes as shown in Table 1). In this regard, the amount of rinsate which is necessary to complete rinsing can be optimally utilized. Thus, the performance of membrane cleaning can be enhanced.

While the present invention is described above in connection with preferred or illustrative embodiments, these embodiments are not intended to be exhaustive or limiting of the invention. Rather, the invention is intended to cover all alternatives, modifications and equivalents included within its spirit and scope, as defined by the appended claims.

The invention claimed is:

1. A method of monitoring a cleaning process capable of cleaning a reverse osmosis membrane separation system comprising the steps of:

providing an inert fluorescent tracer and a cleaning solution;

adding the inert fluorescent tracer and the cleaning solution to the reverse osmosis membrane separation system;

providing a fluorometer to detect the fluorescent signal of the inert fluorescent tracer in the reverse osmosis membrane separation system; and using the fluorometer to determine an amount of the inert fluorescent tracer in the reverse osmosis membrane separation system during the cleaning process.

2. The method of claim 1 further comprising the step of evaluating at least one parameter specific to the cleaning process based on the amount of the inert fluorescent tracer that is measured.

3. The method of claim 1 wherein the inert fluorescent tracer is selected from the group consisting of 3,6-acridinediamine, N,N,N',N'-tetramethyl-, monohydrochloride; 2-anthracenesulfonic acid sodium salt; 1,5-anthracenedisulfonic acid; 2,6-anthracenedisulfonic acid; 1,8-anthracenedisulfonic acid; anthra[9,1,2-cde]benzo[rst]pentaphene-5,10-diol, 16,17-dimethoxy-, bis(hydrogen sulfate), disodium salt; bathophenanthrolinedisulfonic acid disodium salt; amino 2,5-benzene disulfonic acid; 2-(4-aminophenyl)-6-methylbenzothiazole; 1H-benz[de]isoquinoline-5-sulfonic acid, 6-amino-2,3-dihydro-2-(4-methylphenyl)-1,3-dioxo-, monosodium salt; phenoxazin-5-ium, 1-(aminocarbonyl)-7-(diethylamino)-3,4-dihydroxy-, chloride; benzo[a]phenoxazin-7-ium, 5,9-diamino-, acetate; 4-dibenzofuransulfonic acid; 3-dibenzofuransulfonic acid; 1-ethylquinaldinium iodide; fluorescein; fluorescein, sodium salt; Keyfluor White ST; benzenesulfonic acid, 2,2'-(1,2-ethenediyl)bis[5-[[4-[bis(2-hydroxyethyl)amino]-6-[(4-sulfophenyl)amino]1,3,5-triazin-2-yl]amino]-, tetrasodium salt; C.I. Florescent Brightener 230; benzenesulfonic acid, 2,2'-(1,2-ethenediyl)bis[5-[[4-[bis(2-hydroxyethyl)amino]-6-[(4-sulfophenyl)amino-1,3,5-triazin-2-yl]amino]-, tetasodium salt; 9,9'-biacridinium, 10,10'-dimethyl-, dinitrate; 1-deoxy-1-(3,4-dihydro-7,8-dimethyl-2,4-dioxobenzo[g]pteridin-10(2H)-yl)-ribitol; mono-, di-, or tri-sulfonated napthalenes selected from the group consisting of 1,5-naphthalenedisulfonic acid, disodium salt (hydrate); 2-amino-1-naphthalenesulfonic acid; 5-amino-2-naphthalenesulfonic acid; 4-amino-3-hydroxy-1-naphthalenesulfonic acid; 6-amino-4-hydroxy-2-naphthalenesulfonic acid; 7-amino-1,3-naphthalenesulfonic acid, potassium salt; 4-amino-5-hydroxy-2,7-naphthalenedisulfonic acid; 5-dimethylamino-1-naphthalenesulfonic acid; 1-amino-4-naphthalene sulfonic acid; 1-amino-7-naphthalene sulfonic acid; and 2,6-naphthalenedicarboxylic acid, dipotassium salt; 3,4,9,10-perylenetetracarboxylic acid; C.I. Fluorescent Brightener 191; C.I. Fluorescent Brightener 200; benzenesulfonic acid, 2,2'-(1,2-ethenediyl)bis[5-(4-phenyl-2H-1,2,3-triazol-2-yl)-, dipotassium salt; benzenesulfonic acid, 5-(2H-naphtho[1,2-d]triazol-2-yl)-2(2-phenylethenyl)-, sodium salt; 1,3,6,8-pyrenetetrasulfonic acid, tetrasodium salt; pyranine; quinoline; 3H-phenoxazin-3-one, 7-hydroxy-, 10-oxide; xanthylium, 9-(2,4-dicarboxyphenyl)-3,6-bis(diethylamino)-, chloride, disodium salt; phenazinium, 3,7-diamino-2,8-dimethyl-5-phenyl-, chloride; C.I. Fluorescent Brightener 235; benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-, tetrasodium salt; benzenesulfonic acid, 2,2'-(1,2-ethenediyl)bis[5-[[4-[(2-hydroxypropyl)amino]-6-(phenylamino)-1,3,5-triazin-2-yl]amino]-, disodium salt; xanthylium, 3,6-bis(diethylamino)-9-(2,4-disulfophenyl)-, inner salt, sodium salt; benzenesulfonic acid, 2,2'-(1,2-ethenediyl)bis[5-[[4-[(aminomethyl)(2-hydroxyethyl)amino]-6-(phenylamino)-1,3,5-triazin-2-yl]amino]-, disodium salt; Tinopol DCS; benzenesulfonic acid, 2,2'-([1,1'-biphenyl]-4,4'-diyldi-2,1-ethenediyl)bis, disodium salt; benzenesulfonic acid, 5-(2H-naphtho[1,2-d]triazol-2-yl)-2-(2-phenylethenyl), sodium salt; 7-benzothiazolesulfonic acid, 2,2'-(1-triazene-1,3-diyldi-4,1-phenylene)bis[6-methyl-, disodium salt; and all ammonium, potassium and sodium salts thereof; and all mixtures thereof.

4. The method of claim 1 wherein the inert fluorescent tracer is selected from the group consisting of 1-deoxy-1-(3,4-dihydro-7,8-dimethyl-2,4-dioxobenzo[g]pteridin-10(2H)-yl)-D ribitol; fluorescein; fluorescein, sodium salt; 2-anthracenesulfonic acid sodium salt; 1,5-anthracenedisulfonic acid; 2,6-anthracenedisulfonic acid; 1,8-anthracenedisulfonic acid; mono-, di-, or tri-sulfonated napthalenes selected from the group consisting of 1,5-naphthalenedisulfonic acid, disodium salt (hydrate); 2-amino-1-naphthalenesulfonic acid; 5-amino-2-naphthalenesulfonic acid; 4-amino-3-hydroxy-1-naphthalenesulfonic acid; 6-amino-4-hydroxy-2-naphthalenesulfonic acid; 7-amino-1,3-naphthalenesulfonic acid, potassium salt; 4-amino-5-hydroxy-2,7-naphthalenedisulfonic acid; 5-dimethylamino-1-naphthalenesulfonic acid; 1-amino-4-naphthalene sulfonic acid; 1-amino-7-naphthalene sulfonic acid; and 2,6-naphthalenedicarboxylic acid, dipotassium salt; 3,4,9,10-perylenetetracarboxylic acid; C.I. Fluorescent Brightener 191; C.I. Fluorescent Brightener 200; benzenesulfonic acid, 2,2'-(1,2-ethenediyl)bis[5-(4-phenyl-2H-1,2,3-triazol-2-yl)-, dipotassium salt; benzenesulfonic acid, 5-(2H-naphtho[1,2-d] triazol-2-yl)$_2$-(2-phenylethenyl)-, sodium salt; 1,3,6,8-pyrenetetrasulfonic acid, tetrasodium salt; pyranine; quinoline; 3H-phenoxazin-3-one, 7-hydroxy-, 10-oxide; xanthylium, 9-(2,4-dicarboxyphenyl)-3,6-bis(diethylamino), chloride, disodium salt; phenazinium, 3,7-diamino-2,8-dimethyl-5-phenyl-, chloride; C.I. Fluorescent Brightener 235; benzenesulfonic acid, 2,2'-(1,2-ethenediyl)bis[5-[[4-[bis(2-hydroxyethyl)amino]-6-[(4-sulfophenyl)amino]-1,3,5-triazin-2-yl]amino]-, tetrasodium salt; benzenesulfonic acid, 2,2'-(1,2-ethenediyl)bis[5-[[4-[4-[2-hydroxypropyl)amino]-6-(phenylamino)-1,3,5-triazin-2-yl] amino]-, disodium salt; xanthylium, 3,6-bis(diethylamino)-9-(2-4-disulfophenyl), inner salt, sodium salt; benzenesulfonic acid, 2,2'-(1,2-ethenediyl)bis[5-[[4-[(aminomethyl)(2-hydroxyethyl)amino]-6-(phenylamino)-1,3,5-triazin-2-yl]amino]-, disodium salt; Tinopol DCS; benzenesulfonic acid, 2,2'-([1,1'-biphenyl]4,4'-diyldi-2,1-ethenediyl)bis-, disodium salt; benzenesulfonic acid, 5-(2H-naphtho[1,2-d]triazol-2-yl)-2-(2-phenylethenyl)-, sodium salt; 7-benzothiazolesulfonic acid, 2,2'-(1-triazene-1,3-diyldi-4,1-phenylene)bis[6-methyl-, disodium salt; and all ammonium, potassium and sodium salts thereof; and all mixtures thereof.

5. The method of claim 1 wherein the inert fluorescent tracer is selected from the group consisting of 1,3,6,8-pyrenetetrasulfonic acid tetrasodium salt; 1,5-naphthalenedisulfonic acid disodium salt (hydrate); xanthylium, 9-(2,4-dicarboxyphenyl)-3,6-bis(diethylamino)-, chloride, disodium salt; 1-deoxy-1-(3,4-dihydro-7,8-dimethyl-2,4-dioxobenzo[g]pteridin-10(2H)-yl)-D-ribitol; fluorescein; flurorescein, sodium salt; 2-anthracenesulfonic acid sodium salt; 1,5-anthracenedisulfonic acid; 2,6-anthracenedisulfonic acid; 1,8-anthracenedisulfonic acid; and mixtures thereof.

6. The method of claim 1 wherein the inert fluorescent tracer is added to the reverse osmosis membrane separation system in an amount from about 5 ppt to about 1000 ppm.

7. The method of claim 1 wherein the inert fluorescent tracer is added to the reverse osmosis membrane separation system in an amount from about 1 ppb to about 50 ppm.

8. The method of claim 1 wherein the inert fluorescent tracer is added to the reverse osmosis membrane separation system in an amount from about 5 ppb to about 50 ppb.

9. The method of claim 1 wherein the cleaning process is performed on-line.

10. The method of claim 1 wherein the cleaning process is conducted off-line using a clean-in-place system.

11. The method of claim 2 wherein the parameters specific to the cleaning process are selected from the group consisting of a concentration of the cleaning solution, a hold-up volume of the reverse osmosis membrane separation system and combinations thereof.

12. The method of claim 1 further comprising controllably adjusting the cleaning process to optimize performance based on the amount of the inert fluorescent tracer that is measured.

13. A method of cleaning a reverse osmosis membrane separation system including a reverse osmosis membrane capable of removing impurities from a feed stream comprising the steps of:

providing an inert fluorescent tracer and a cleaning solution;

flushing the reverse osmosis membrane separation system;

adding the inert fluorescent tracer and the cleaning solution to the reverse osmosis membrane separation system;

circulating the inert fluorescent tracer and the cleaning solution in the reverse osmosis membrane separation system;

rinsing the reverse osmosis membrane separation system;

providing a fluorometer to detect the fluorescent signal of the inert fluorescent tracer in the reverse osmosis membrane separation system;

using the fluorometer to measure an amount of the inert fluorescent tracer ranging from about 5 ppt to about 1000 ppm in the reverse osmosis membrane separation system; and evaluating at least one process parameter specific to cleaning based on the amount of the inert fluorescent tracer that is measured.

14. The method of claim 13 further comprising soaking the reverse osmosis membrane in the cleaning solution subsequent to the step of circulating the cleaning solution.

15. The method of claim 14 wherein the inert fluorescent tracer is measured during at least one of the steps of circulating, soaking and rinsing.

16. The method of claim 13 wherein the inert fluorescent tracer is measured in an amount ranging from about 1 ppb to about 50 ppm.

17. The method of claim 16 wherein the inert fluorescent tracer is measured during the circulating step to determine a dilution effect with respect to a concentration of the cleaning solution due to a hold-up volume of the reverse osmosis membrane separation system.

18. The method of claim 16 wherein the inert fluorescent tracer is measured during the rinsing step to determine a removal of the cleaning solution from the reverse osmosis membrane separation system due to rinsing.

19. The method of claim 13 further comprising removing a treatment chemical containing a fluorescent agent from the reverse osmosis membrane separation system during cleaning.

20. The method of claim 19 further comprising monitoring the removal of the treatment chemical by measuring an amount of the fluorescent agent during the rinsing step.

* * * * *